United States Patent [19]
Corbett

[11] 4,435,241
[45] Mar. 6, 1984

[54] METHOD OF EXTRUDING LAMINATED FILM

[75] Inventor: Herbert O. Corbett, Bridgeport, Conn.

[73] Assignee: National Distillers and Chemical Corporation, New York, N.Y.

[21] Appl. No.: 654,941

[22] Filed: May 26, 1967

[51] Int. Cl.³ .............................................. B29C 19/00
[52] U.S. Cl. .......................... 156/244.11; 156/244.22; 264/176 R; 427/412.3
[58] Field of Search ...................... 156/244.11, 244.22; 264/176 R; 427/407 R

[56] References Cited

U.S. PATENT DOCUMENTS 2,809,393 10/1957 Hauptman ............................... 18/13
3,223,761 12/1965 Raley ...................................... 264/95

FOREIGN PATENT DOCUMENTS

171046 4/1952 Austria ................................ 264/173
1281172 11/1961 France ................................ 264/171

*Primary Examiner*—Stephen J. Lechert, Jr.
*Attorney, Agent, or Firm*—Kenneth D. Tremain

[57] ABSTRACT

A lamination die apparatus; a method of extruding; and extruded products where two or more laminarly flowing plastic layers are joined in front of an extrusion nozzle, and are simultaneously extruded through the extruded nozzle. The laminarly joined flows are caused to diverge before being extruded through the extrusion orifice. The various layers may be of the same or different material. The layers variously include polyethylene, polypropylene, polyvinylchloride and can have electrical or magnetic particles mixed therein to impart electrical or magnetic characteristics to the film. The die structure may be for blowing tubular film or for the extrusion of flat film. The flat die includes a diverter for diverting a main stream into at least two paths of laminar flow and injecting a central plastic fluid between these two paths.

11 Claims, 29 Drawing Figures

METHOD OF EXTRUDING LAMINATED FILM

This invention relates to novel apparatus and methods for the production of novel laminated products and more specifically relates to the production of laminated products wherein two or more overlying and coextensive fluid films are formed with laminar flow and, after forming of the laminar streams, are extruded through a common extrusion die orifice, the laminated sheet undergoing a lateral extension with a substantially zero coefficient of friction at the interfaces of the laminated products. By laminar flow is meant the flow of two or more adjacent streams without turbulence so there is no mixing of the materials of the streams. The present invention particularly recognizes that laminarly flowing adjacent streams can undergo a lateral extension without causing normally expected turbulence due to adherence between the stream surfaces.

There is a widespread need for laminated materials, in flat sheets or tubes in many varied applications.

By way of example, the seal range of presently used low density high melt index overwrap platic film is relatively critical. In accordance with the invention, one side of the film can have a surface laminated thereon of high density, low melt index film, while the other side of the film can be of relatively stiff material. As another example, two separate streams could be laminated to insure a pinhole-free product. Again, materials of different compositions and different colors could be internally laminated to produce a desired structure or form some desired pattern. Many other novel products which can be formed in accordance with the invention will be described hereinafter.

Heretofore, compound extrusions have been accomplished with dissimilar and/or pigmented polymers. Such dies are complex in design, and usually contain one or more separate passages to separate adjacent or concentric orifices and the molten polymers are joined, sealed or adhered together, in the area beyond the extrusion die lips.

Other arrangements are known to the art whereby laminated products are formed within an extrusion die. In these arrangements, however, it is not recognized that the product can be laterally extended before or after leaving the die while maintaining the integrity of the laminations.

By lateral extension, is meant the extension of the film in a direction perpendicular to the direction of the flow path. Thus, in a circular extrusion, the diameter of the flow channel within the die may constantly increase to the discharge orifice while still maintaining an integral laminar relationship among the second materials.

For example, U.S. Pat. No. 2,695,422 shows a device where lamination-type techniques are used for coating wire. However, no attempt is made to stretch or extend the laminated films, nor is the possibility recognized. Similarly, U.S. Pat. No. 2,501,690 for making hose fails to recognize the application of lamination techniques to materials which are stretched or extended.

As an important feature of the present invention, a novel die structure and method is provided wherein similar and dissimilar polymeric elastomers, some of which may be pigmented, are joined prior to discharge from a common extrusion orifice, and are extended laterally and longitudinally after discharge, and while still in a molten condition, to form a laminated film product. By a film product, is meant one whose thickness is less than 10 mils, as contrasted to a sheet product whose thickness is greater than 10 mils. In accordance with the invention, these film products could be as thin as 0.1 mils (0.0001").

More particularly, since all layer thicknesses are independently controllable during and after extrusion of the thermoplastic material, and compatibility of the relative materials comprising each independent film is unaffected, each layer can represent any percentage of the whole film section with any single layer being as thin as 0.000066 inches in thickness. Laminated products of this thickness are not known to have been produced heretofore with methods available to the prior art.

More particularly, the conventional methods wherein preformed finished films are overlayed and joined could not deal with films of such thin and fragile gauge dimensions.

Thus, though it is known that two films can be individually cast and then laminated together either by adhesives, or otherwise, in such a method a certain minimum stiffness, and thus thickness, is required for the handling of the individual films. Since the individual layers of film are not handled separately when using the process of the invention, it now becomes possible to laminate film layers of a thinness previously unusable.

In accordance with the invention, dissimilar, similar and pigmented thermoplastics can be introduced under pressure into the same extrusion die and be made to laminate over, under and inbetween a base extrudate if desired. This also applies for dissimilar polymers, i.e., polyethylene, polypropylene and vinyls and virtually any combinations of extrudable thermoplastic material. Control of this process is every easily accomplished since each different thermoplastic material is supplied from one or more single respective extruders and the various molten streams are joined or associated within a common extruder die by laminar flow within the die.

This might be accomplished through use of two extruders feeding a single die. The lamination will occur no less than $\frac{1}{4}''$ inside the die and a good seal between the two layers is assured. The joined streams then flow laminarly toward the outlet or discharge orifice without mixing.

The die may be constructed with an internal core dividing a first feed channel into two streams. A second feed channel in the core then supplies a central layer for the product to be formed. Control of amount and gauge of the various streams may be obtained by appropriate location and dimensioning of the core. As previously stated, the streams would join somewhere within the die so the lamination is formed under pressure.

The extrusion die of the invention may also be of the type having a tubular orifice for the formation of an extruded tube. This type die will have an internal mandrel forming a circular discharge orifice with the die body, with expansion of the tube occurring within the die or, by virtue of air pressure within the tube, after discharge of the tube.

A wholly unexpected feature of this invention is that the laminated films have, during extension of the film, very little friction at their interfaces so that the two films, which are coextensive, will extend independently of one another and uniformly, notwithstanding that they may have different mechanical properties.

By way of example, in the case of a flat die arrangement, the laminated stream flows through a relatively small internal die channel, to be discharged by way of an extended orifice, whereby the film must extend laterally over a considerable distance. Because of the unexpected low friction forces between the laminate interfaces, each film was able to extend independently and uniformly without any mixing of the films or interfilm friction. Similarly, in the case of a circular die, the laminates have a constant radial thickness due to the low interfacial friction, and no undue gauge variation was found in the films so produced.

Whether the die is circular or flat, additional channels may be added to introduce new flow paths so that at least four films can be laminated into a single sheet. Moreover, a die rotating structure could be used with a circular die, with the outer laminate being a stripe which forms a helical lamina on the body of the film.

It will be further shown that the novel die and techniques of the invention can be utilized for application to injection or blow molding systems, whereby to produce symmetrical products for the formation of lined elements such as bottles.

The novel apparatus and method of the invention has been used for the formation of a great number of plastic film products, many of which are novel in themselves. Examples of these novel products will be provided in detail hereinafter.

Accordingly, a primary object of this invention is to provide a novel apparatus and method for producing laminated thermoplastic materials.

Another object of this invention is to provide a novel laminated film product in which the films in the laminate may have a thickness as small as 0.000066 inches.

A further object of this invention is to provide a novel method for the formation of laminated film products wherein the laminated products are coextensive with one another and are joined by laminar flow within an extrusion die, and before discharge from the die orifice.

Yet another object of this invention is to laminarly join two films of plastic of differing mechanical properties, and to extend the formed products with substantially no frictional effects occurring at the interface of the plastic laminae.

Another object of this invention is to provide a novel overwrap film having an increased seal range.

A further object of this invention is to provide a novel fire-resistant film.

Another object of this invention is to provide a novel plastic film having bead sections laminated therein to serve as tear strips.

Yet another object of this invention is to provide a high strength film having a pre-stressed skin structure.

Still another object of this invention is to provide a novel laminated film having a metallic hue.

A further object of this invention is to provide a novel laminated film in which shredded strands or flakes of any desired material in a plasticized form is captured between smooth plastic films.

Yet another object of this invention is to provide a novel oxygen transmissible film for meat wrap.

A further object of this invention is to provide a novel hydrophilic film wrap which avoids visible condensation on at least one surface thereof.

Another object of this invention is to provide a novel film wrap which resists transmission of oxygen to wrapped material such as cheese or other oxygen-sensitive material.

These and other objects of this invention will readily become apparent upon reading the following description of the accompanying drawings, in which:

FIG. 5b shows a cross-sectional view of the plate body of FIG. 5a.

FIG. 5c shows a top plan view of the diverter orifice of FIG. 5a.

Figure 1:
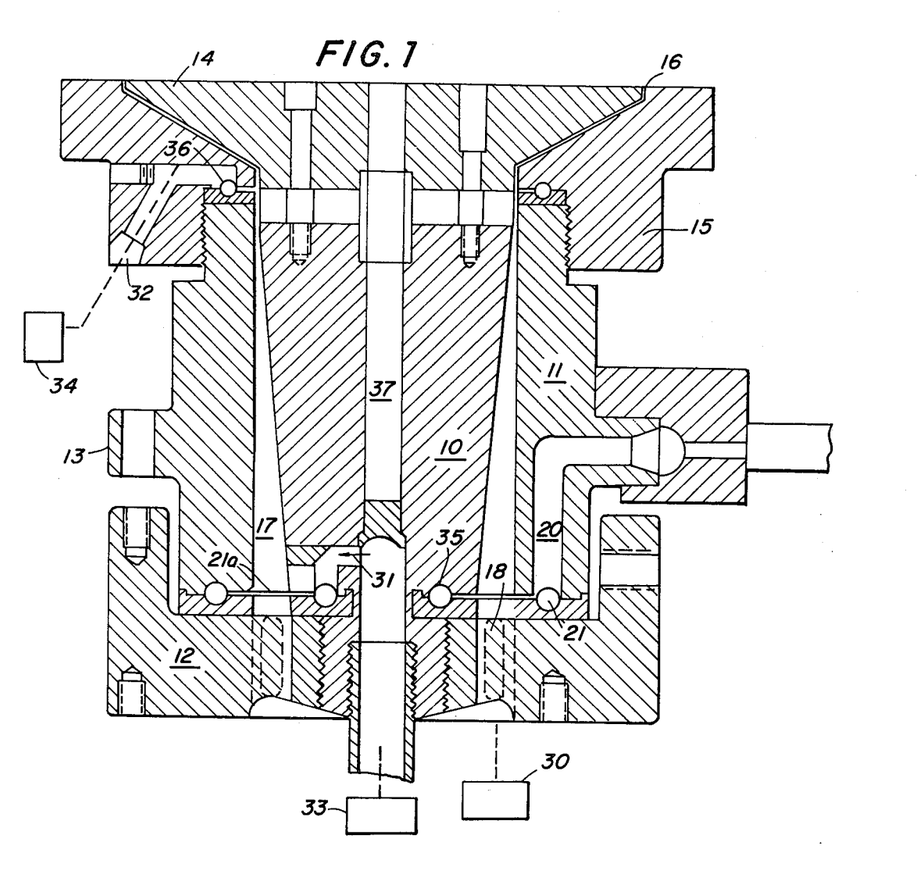
FIG. 1 shows a view in vertical section of an extrusion die adapted to join four laminates ahead of a common circular die orifice, wherein the extruder sources of the four streams are shown schematically.
Figure 2:
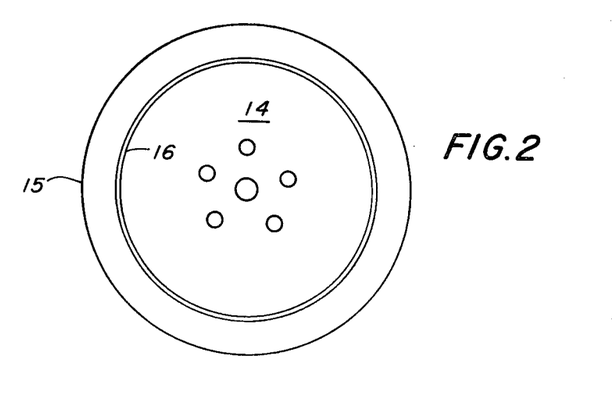
FIG. 2 shows a top plan view of the die of FIG. 1.

Referring now to the drawings, in FIGS. 1 and 2 there is illustrated an extrusion die having a central mandrel 10 within an outer die body 11 adjustably connected to a die base 12 by suitable bolts connected from flange 13 in outer body 11 to base 12 in the usual manner. An inner ring 14 and outer ring 15 are suitably connected to mandrel 10 and outer body 11 respectively to define a circular die orifice 16. In this structure, various sizes of pairs of rings 14 and 15 can be used to obtain various diameters for orifice 16.

Orifice 16 communicates with annular channel 17, as shown, where channel 17 is connected to a first extruder schematically shown as extruder 30 which supports the die and forces a molten product under pressure through annular web 18 and into channel 17.

Up to this point, the die described is of a type well known to the art and operates to discharge an appropriately inflated tube of an appropriate polyolefin through orifice 16.

In accordance with the invention, a conduit 20 passes through body 11 and communicates with a suitable annular channel or passage 21, opening into the channel 17 through an annular orifice 21a in the outer wall of channel 17. The conduit 20 is connected to a second extruder or second source of plastic material, schematically shown as extruder 22, which material may be similar or dissimilar to the first material forced through web 18. Because of the laminar flow of molten material within channel 17 toward orifice 16, the material from orifice 21 coats the outside of the material coming through web 18, whereby the two streams are laminately joined under pressure prior to discharge from orifice 16. As the molten materials are ultimately passed through orifice 16, the resultant product is formed of two laminae which have the desired characteristics in its respective opposite surface portions. Moreover, the extruded tube may be distended to increase its diameter, without rupture of either lamina when the tube is inflated since, until the tube laminae are set by cooling, they have been found to have substantially zero friction at their interface.

Further, in accordance with the invention, a tube having any desired number of laminar plies can be formed. Thus, in FIG. 1, two additional molten products may be injected into the die through channels 31 and 32 respectively which are connected respectively to extruders schematically shown as extruders 33 and 34. Channels 31 and 32 communicate with annular orifices 35 and 36 respectively which, in turn, communicate with the channel 17 through the respective inner and outer wall surfaces thereof.

During operation of the die of FIGS. 1 and 2, a gas under pressure is applied to the interior of the plastic tube, formed by the extrusion from die orifice 16, by way of the channel 37 in mandrel 10. Any suitable means can be used to introduce this gas into channel 37. With extruders 30 and 22 in operation, the material from extruder 22 and channel 21 will be deposited on the outer surface of the molten material from extruder 30 passing upwardly through channel 17. The laminated product will then be forced through orifice 16 with the resulting tube being formed of the two similar or dissimilar layers intimately bonded to one another.

When extruder 34 is also in operation, it will deposit a further layer of material on the layered material from extruder 22. The resultant tube leaving orifice 16 will then be comprised of a "3-ply" material with each layer having its own particular characteristics.

When extruder 33 is also in operation, it will deposit a further, and inner layer of material on the interior of the film moving up channel 17. Thus, a four-ply film with be forced through orifice 16 having an outer layer of the material from extruder 34, a second layer of material from extruder 22, a third layer of material from extruder 30, and an innermost layer of material from extruder 33.

Figure 3:
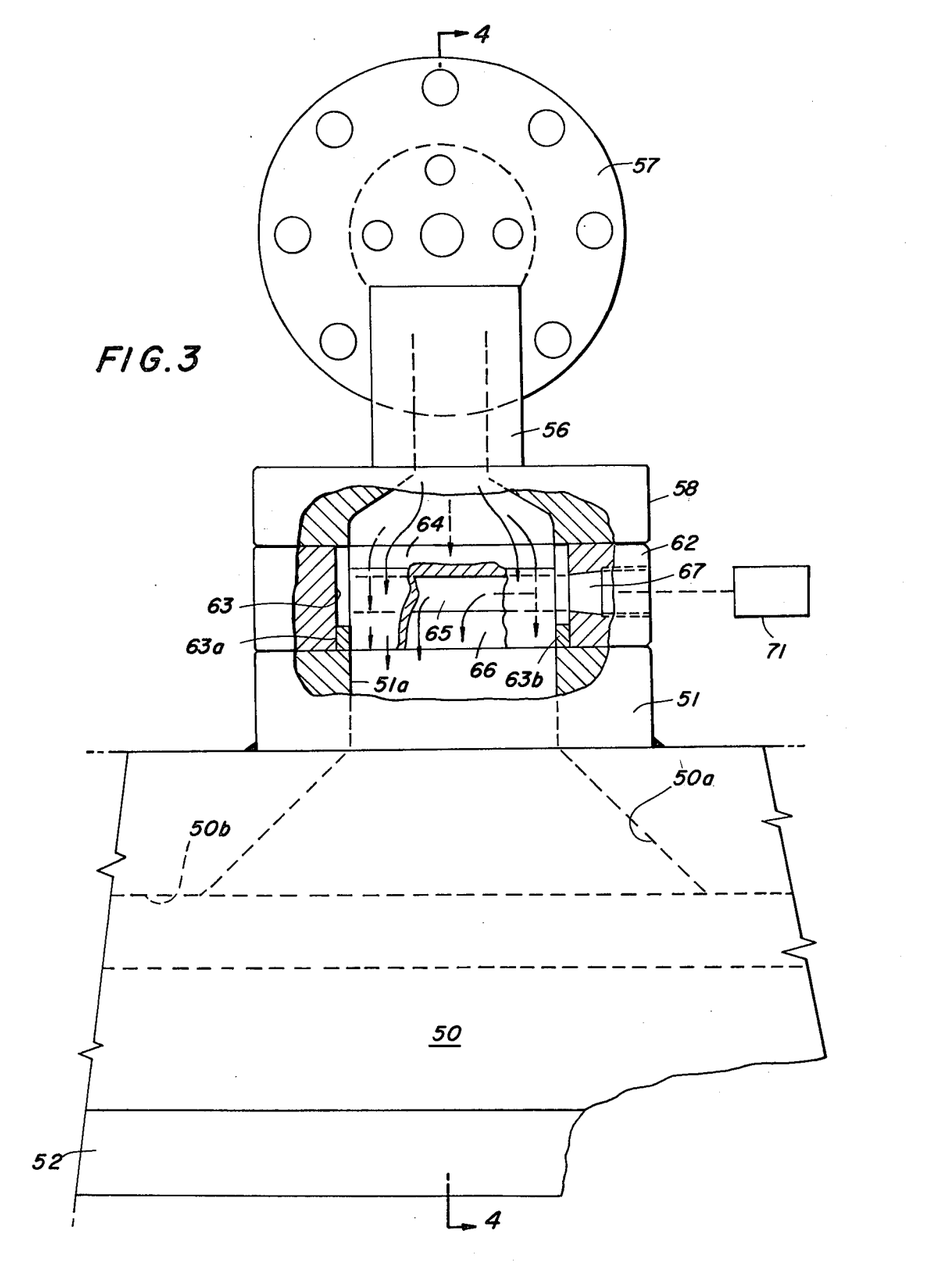
FIG. 3 shows a front elevation view of a novel flat die constructed in accordance with the present invention.
Figures 4, 7:
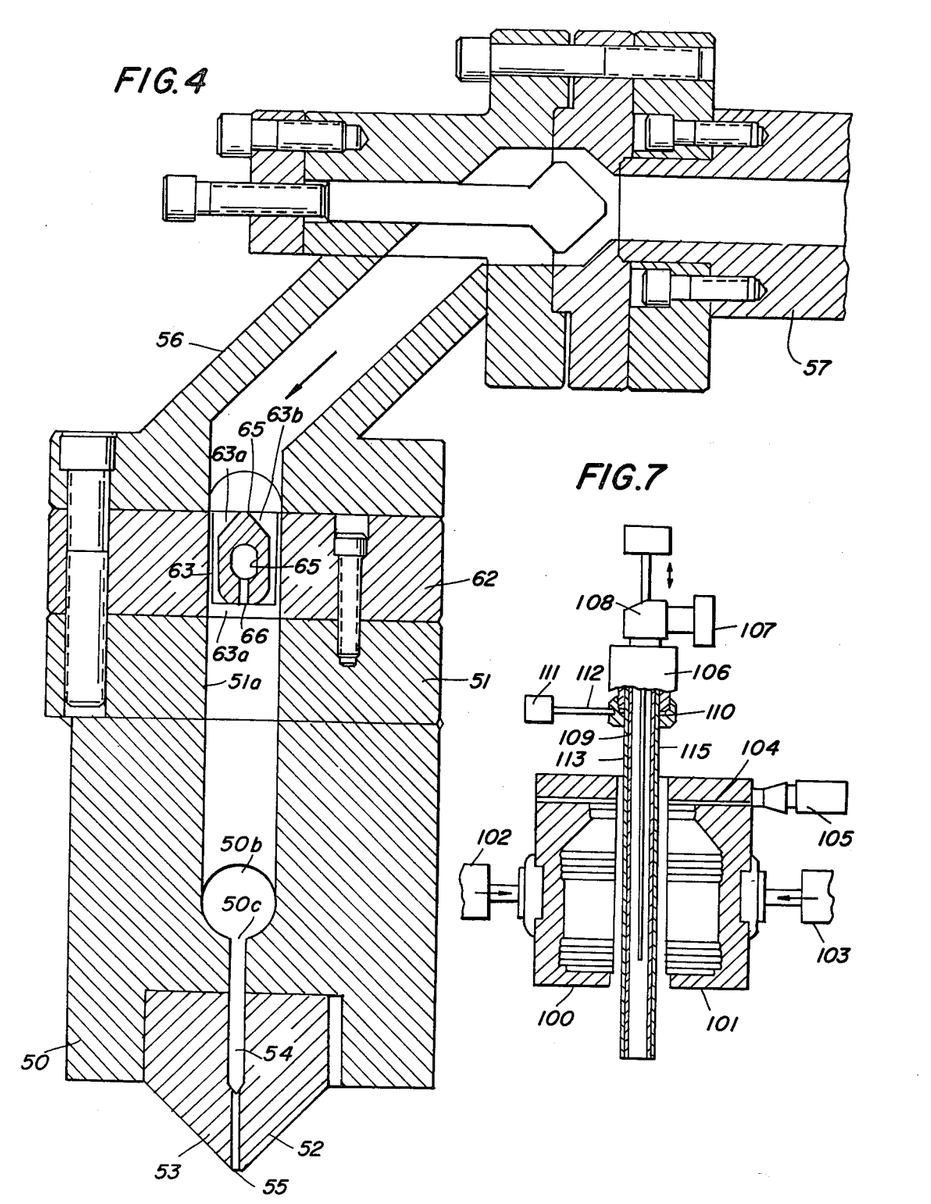
FIG. 4 shows a cross-sectional view of FIG. 3 taken across the lines 4—4 in FIG. 3.
FIG. 7 illustrates apparatus using the concepts of the present invention for blow molding techniques.
Figure 5:
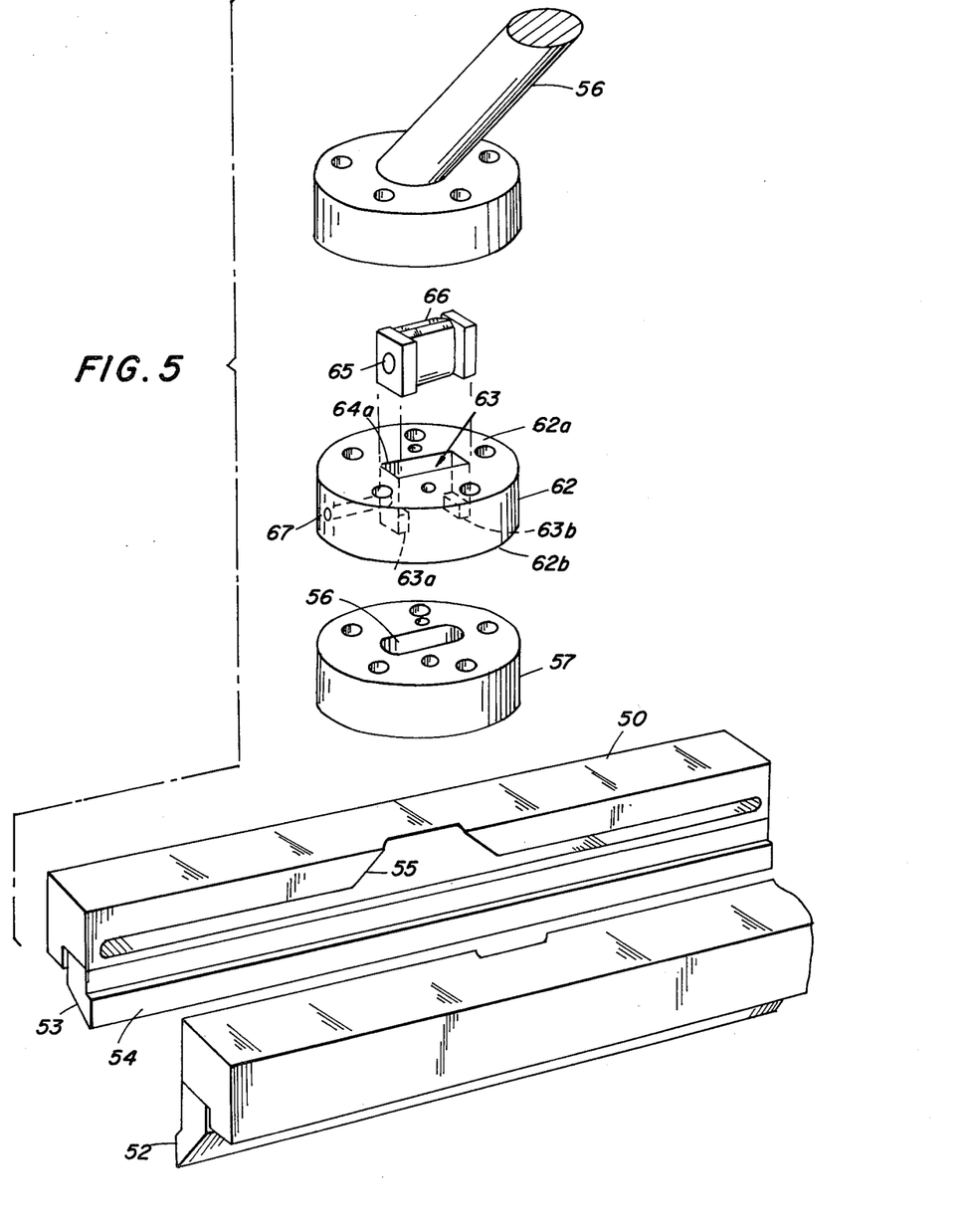
FIG. 5 shows a perspective view of the novel die of FIGS. 3 and 4.
Figure 5A:
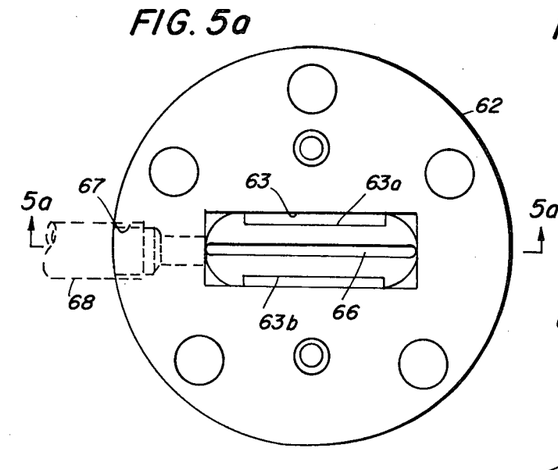
FIG. 5a shows a bottom view of the novel diverter orifice plate of FIGS. 3 and 4.
Figure 5B:
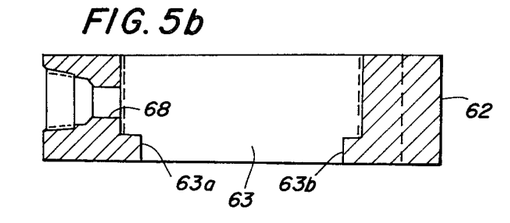
Figure 5C:
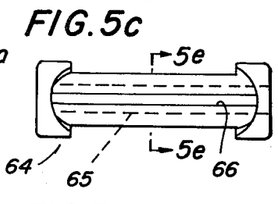
Figure 5D:
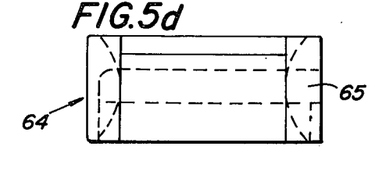
FIG. 5d shows a side plan view of the diverter orifice of FIG. 5c.
Figure 5E:
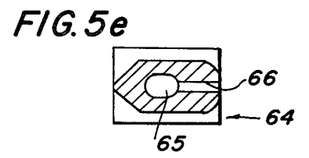
FIG. 5e shows a cross-sectional view of FIG. 5c across lines 5e—5e in FIG. 5c.

Referring now to the structure as shown in FIGS. 3, 4 and 5, a sheet extruding die is illustrated, including diverter means whereby to accomplish the novel, laminar flow method of extrusion contemplated by the present invention. In this structure, the numeral 50 designates a generally conventional flat die body having a neck portion 51. A passageway 51a is formed in the neck portion, and communicates with an angularly extended or divergent passageway 50a in the body 50. The passageway 50a, in turn, opens into a channel 50b extending for substantially the total width of the die, being closed at the outer ends, but having a coextensive radial outlet such as designated by the numeral 50c.

Also, in generally conventional fashion, the die body is adapted to receive a pair of die lips 52 and 53, mounted on the valve body 50 in parallel spaced relation to provide an intermediate passageway 54 in communication with the passageway 50c and opening through an orifice 55 for discharge of a sheeted film product. Means, not shown, are conventionally provided for attachment of the lips 52 and 53 to the die body 50, and also for adjustment of the lips to provide for gauge control in the film web discharged from the orifice 55.

In the conventional structure, the neck portion 51 would be bolted directly to an extruder nozzle such as designated by the numeral 56 in FIGS. 3, 4 and 5, the nozzle 56 being secured in turn at the outlet of the extruder barrel 57. In the modified apparatus shown, however, a diverter plate 62 is interposed between the nozzle 56 and neck portion 51.

The diverter plate, as shown, is adapted to provide a matched fit intermediate the nozzle 56 and the neck 51. The plate 62 may be considered as having obverse and reverse surfaces 62a and 62b. The plate itself generally conforms to the shape of the neck 51 and nozzle 56 and is secured thereto as by means of bolts. A shouldered passageway 63, opening through the obverse and reverse surfaces of the plate 62, also is adapted to match at least the passage 51a. The numerals 63a and 63b designate the passageway shoulders.

In the passageway 63 is a diverter element 64. This element is shaped to divide the passageway into two parts providing two flow channels therein which are spaced apart by the body of the element. This element is formed from a solid block having a length and width such as to permit its press fitted insertion into the passageway 63, and a depth such as to permit its engagement against the passageway shoulders 63a and 63b, with the opposite edge portion surface lying in the same plane as the obverse surface 62a of the plate 62. As shown, intermediate the ends of the block, it is machined on both sides in an area substantially corresponding to the distance between the shouldered portions of the plate passageway to produce a channeled portion on each side wherein the surface is adapted to cooperate with the wall of the passageway 63 to form the flow channels 63a and 63b. The outer edge of the block is also machined to provide a wedge-shaped contour which serves to split a stream of molten or plasticized material into two streams which will flow through channels 63a and 63b. Likewise, the inner edge of the block is machined substantially in the manner shown to achieve streamlined flow.

In addition, the block is drilled to provide an internal passageway 65 having an orifice outlet 66 opening radially in parallel relation to the respective surfaces of the channeled portions. The drilled passageway has an inlet disposed so as to coincide with a corresponding passageway 67 drilled through the side edge of the plate 62, and centered on a line parallel to the side walls of passageway 63. The passageway 67 is internally threaded at its outer end to receive a supply conduit 68, adapted for connection to a second extruder such as the extruder 71 of FIG. 3. FIGS. 5a, 5b, 5c, 5d and 5e illustrate the nature and structural features of the diverter plate 62 and element 64 in greater detail.

In operation, and referring particularly to FIGS. 3 and 4, a first thermoplastic material is forced from extruder 57 into nozzle 56. The diverter element 64 in plate 62 causes this material to divide and flow in channels 63a and 63b. At the same time, a second extruder such as schematically illustrated extruder 71 forces a second molten material into channel 65 in diverter element 64 and through discharge orifice 66. Accordingly, the product flowing below diverter 65 will be a laminate of a central material determined by extruder 71 and outer surfaces determined by extruder 57. This flows to the die orifice 55 in a laminar manner so that there is no mixing of the various layers whereby the discharged product will be a laminated film wherein the various layers may have gauge dimensions too thin to be produced by presently known techniques.

Moreover, and as an unexpected feature of the invention, the laminated structure easily spreads throughout the length of the die passageways when the film goes from the narrow width to wide width within the die. This occurs because of the unexpectedly low or near zero frictional interface between adjacent layers.

It will be noted that additional plies can be introduced by providing additional discharge orifices in the diverter 64, or in the walls forming passageway 51a. Moreover, the relative thicknesses of the various laminae could be varied by using different thicknesses for channels 63a and 63b between the plate 62 and diverter element 64. Moreover, an important feature of the novel structure is that a standard line can be quickly modified for lamination operation by the simple addition of a suitable plate 62.

Figure 6:
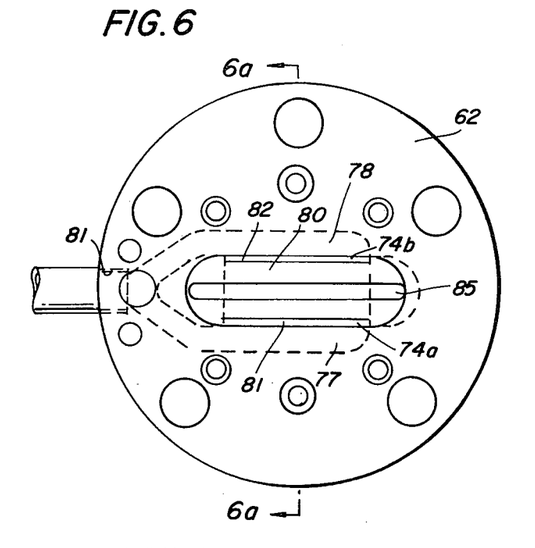
FIG. 6 shows a modified diverter orifice plate wherein the main feed is through the central slot in the diverter orifice.
Figure 6A:
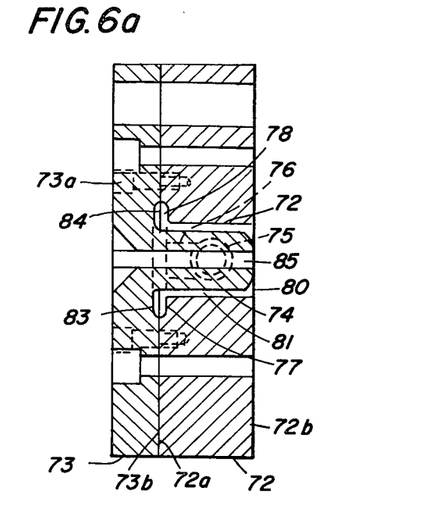
FIG. 6a shows a cross-sectional view of FIG. 6 taken across lines 6a—6a in FIG. 6.

A modified type of diverter plate is illustrated in FIGS. 6 and 6a wherein film is produced with the central lamina being formed from the main extruder 60 of FIGS. 3 and 4, while the coating laminae are produced from the extruder 71 of FIG. 3.

The diverter plate as shown in FIGS. 6 and 6a differs from the plate 62 of FIGS. 3, 4 and 5 in that it is, as shown in FIG. 6a, formed in two parts, female and male, respectively designated by the numerals 72 and 73. The part 72 is similar to the plate element 62 of the preceding figures and has obverse and reverse surfaces 72a and 72b, and a passageway 74 defined in the plate and opening through said surfaces. This passageway is disposed intermediate the side edges of the plate along a diameter thereof. In effect, this passageway is an elongated slot extending radially from the plate center to an equal distance in each direction therefrom. The ends of the passageway preferably are rounded and machined to provide a mating surface adapted to match with a similar mating surface on male part 73, as leter set forth.

The plate 72 is drilled to provide a bore 75 extended through the edge of the plate intermediate the obverse and reverse surfaces and on a line parallel with the side walls of passageway. The bore 75 stops short of one end of the passageway 74. A bore 76 is also drilled through the obverse surface on a center line intersecting the center line of the bore 75, to open into the latter.

The obverse surface is routed to form bifurcate grooved portions 77 and 78 starting from the opening of bore 76 and extending into parallel open sided relation to the passageway 74 intermediate the ends thereof. Similar and matching grooves are formed in the male part 73, as later described.

The male part 73 is of substantially the same dimension and conformation as the part 72, and has obverse and reverse surfaces 73a and 73b. On the reverse surface of this part 73 is an elongated boss 80 originally having the exact conformation of the passageway 74, the end parts being rounded and polished for mating relationship with the end parts of the passageway or slot 74. The side walls of the boss, however are routed and machined to provide wide flat groove portions 81 and 82. The bottom faces of the respective grooves, when disposed, as particularly shown in FIG. 6, in opposition to the side walls of the passageway 74 cooperate therewith to define a pair of channels 74a and 74b.

The reverse surface of the plate part 73 is also routed to form grooves 83 and 84 adapted for matched relation to the grooves 77 and 78. These grooves 83 and 84 at the base of the boss 80, are formed to open laterally into the grooves 81 and 82 in the boss. A slotted portion 85 is formed in the boss to open therethrough from the obverse surface of the plate part 80. This portion 85 parallels the grooves 81 and 82, and is substantially coextensive therewith for the length of the groove portions 81 and 82.

In use, the plate parts 71 and 72 are assembled by insertion of the boss 80 into the passageway or slot 74, with the groove portions 83 and 84 matched to the grooves 77 and 78 respectively, whereby they cooperate to form a bifurcate passageway communicating with the bore 76. The two plate parts may then be bolted together to form a united assembly.

This assembly may be employed in substitution for the plate 62 of FIGS. 3 to 5 inclusive. As will be evident, when so employed, the feed from the extruder 57 will be delivered through the longitudinal slot 85 in the boss 80, while the feed from the extruder 71 will be delivered by way of the bores 75 and 76 and the bifurcate passageway to the channels 74a and 74b. Thus, whereas when using the plate 62 and its diverter element 64, the feed from extruder 57 is divided to coat both sides by the stream supplied from extruder 71, when using the plate assembly of FIGS. 6 and 6a, the coating action is reversed, the feed from extruder 57 being coated on both sides by the stream supplied by extruder 71.

While the invention has been described heretofore in connection with the drawing of thin film, it will be apparent that the novel laminating method and apparatus are equally applicable to molding techniques in general. By way of example, FIG. 7 illustrates the manner in which the invention would apply to a blow mold system for the production of symmetric articles such as bottles which have an interior lining which is particularly impervious to the material which is to be contained by the bottle, while the exterior surface is of a relatively inexpensive material. If desired, a third outer layer of easily printable material could be added, should the main outer layer not be of such quality.

Referring now to FIG. 7, I have schematically illustrated a well known type of blow molding system which includes mold halves 100 and 101 which define a symmetric bottle, and are connected to and supported by suitable rams 102 and 103 respectively. The upper portion of the mold receives a suitable knife 104 which is operated by mechanism 105 in the usual manner.

The die used in the blow mold system is schematically illustrated as die 106 which is connected to an extruder 107 through a suitable adaptor 108. The die 106 is such that it will extrude a hollow cylindrical tube of material 109 through a suitable die orifice under pressure from extruder 107.

In accordance with the invention, an annular discharge orifice 110 is added to the die 106, and is connected to a second extruder, schematically illustrated as extruder 111, through the conduit 112. The material of extruder 111 will operate to place an external coating of material characterized by material from extruder 111 on the layer 109. Thus, the tube shown below die 106 has an inner layer 109 of material from extruder 107 and an outer layer 113 of material from extruder 111. The material 109 will be of some material desired as the bottle lining material and can be selected to be particularly impervious to the material contents for which the bottle is designed. The outer material 113 is then relieved of the function of being resistant to the contents of the bottle, and so can be selected for qualities of strength and cost. If desired, an additional layer could be laminated outside of layer 113 which is particularly capable of being printed, should the material 113 not be so capable.

In operation, the tube is discharged from the die and concentrically with an air blowing tube 115 which extends through the die 106 and adaptor 108. The tube 115, as is usual for such arrangements, may be withdrawn from the die. Thus, when the tube extruded from die 106 is long enough, the rams 102 and 103 cause mold halves 100 and 101 to close. Air pressure is then applied to cause the tube to expand into the mold to conform to the mold shape and the bottom of the tube is sheared off. Thereafter, the air tube 115 is withdrawn, and knife 104 is operated by its operating mechanism 105 to shear the top of the mold. Thereafter, the mold is opened and the symmetric article molded is removed and a new cycle is begun.

It will be apparent that the same techniques described in FIG. 7 would be equally applicable to an injection molding system whereby symmetric articles can be injection-molded with some predetermined liner material and some other predetermined body material.

As previously indicated, it is sometimes desirable to laminate at least one stripe into the body of the material being extruded. It is apparent that in the embodiment of FIGS. 3, 4 and 5, this type of striping can be achieved by simply constricting the width of the discharge orifice 66 in the adaptor member, whereby the flow of the striping material is reduced to an amount less than required to coat the entire surface of the flow streams through channels 63a and 63b.

In the case of the circular die arrangement of the type described in FIGS. 1 and 2, it is also possible to introduce a stripe into the tube being extruded, and it is also possible to cause the tube to rotate, whereby the stripe appears to spiral about the finished product.

Figure 8:
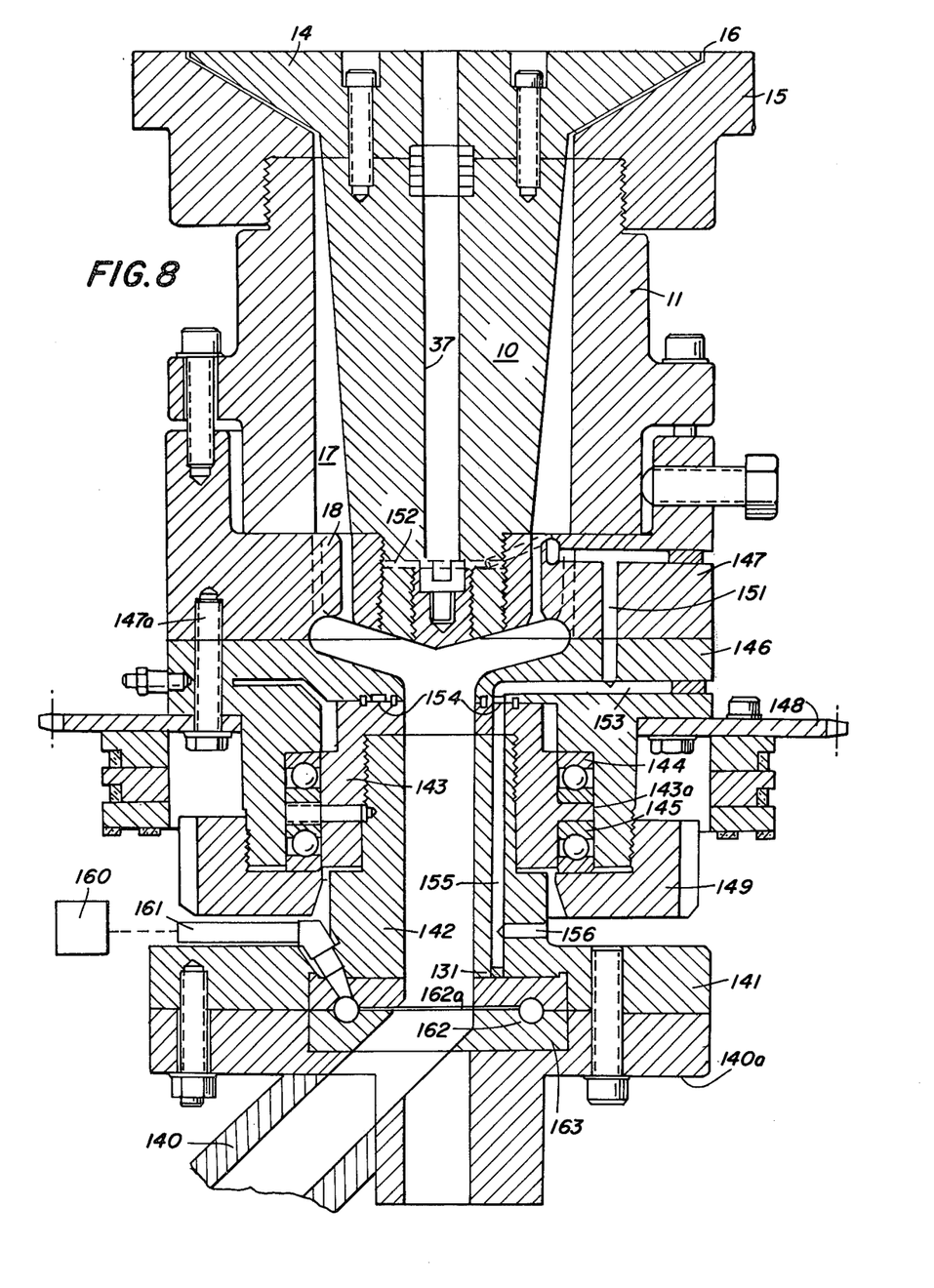
FIG. 8 illustrates the type of die shown in FIGS. 1 and 2 wherein a die rotating structure is provided.

A suitable rotating structure, along with another embodiment of means for injecting a coating film, is particularly illustrated in cross-section in FIG. 8. In FIG. 8, a portion of the die is essentially similar to that described in FIGS. 1 and 2 so that similar parts have been given similar identifying numerals.

The die structure as shown in FIG. 8 is a rotatable die adapted for employment of the laminar flow extrusion technique according to the present invention. In the drawing, the numeral 140 designates an extruder nozzle having a flanged outlet 140a. Mounted on this outlet, and fixed thereto is a pivot plate 141. This plate provides a substantially concentric boss 142 extended therefrom, the plate and boss defining a conduit passage way adapted for communication with the interior of nozzle 140.

On the outer and an annular die bearing cap 142, is threaded on to the boss, and pinned thereto. The cap 143 provides an annular flange 143a, adapted for engagement by two annular ball bearing raceway assemblies 144 and 145. The remainder of the die structure is supported on the bearing 144 for rotation about the cap 143.

The die assembly itself includes two mated die support plates 146 and 147 respectively. These are annular members adapted to define a continuation of the flow passageway through the pivot plate 141. The plate 146 is supported on the cap 143 and the bearing 144 substantially in the manner illustrated, and is adapted for mounting of a peripheral gear or sprocket plate 148, through which the plate 146 and the balance of the die assembly may be driven for rotation about the cap 143.

The plate 147 corresponds to the die base 12 of FIG. 1, but is modified to provide a conduit passageway 151 forming part of an air supply conduit system.

An annular thrust cap member 149, adapted for threaded engagement with the plate element 146, and bearing against the bearing 145, serves to draw the plate 146 into sealed rotationally movable relation to the pivot cap 143. Means such as baffle rings 150 accomplish the seal. The plate 147 corresponds to the die base 12 of FIG. 1, but is modified to provide a conduit passageway 151 which forms a part of an air conduit system later described.

The balance of the die structure, beyond the plate 147, also corresponds to the structure of FIG. 1, including the die body 11, a mandrel 10, annular orifice members 14 and 15 and an orifice 16, continuous with an annular channel or passageway 17. The mandrel 10 provides a central bore 37 which is closed at its inner end, and connected, by a passage, not shown, to an annular groove 152 in the plate 147. This groove is connected in turn, and substantially as shown, to the air conduit passageway part 151 in plate 147.

The remainder of the air supply system is formed by a bore 153 in the plate 146, an annular groove 154 in the same plate, and a bore 155 extended continuously through the boss 143 and the cap 143, this bore having an inlet at 156. In drilling the several straight line bores, or passageways, openings are created which must then be plugged. Such plugs are shown, but not specially designated.

In order to provide for a laminar flow extrusion system as contemplated by the present invention, in the apparatus of FIG. 8 the main extrusion flow derived through the nozzle 140 is supplemented by flow from a second extruder schematically designated by the numeral 160. The second extruder is connected as by means of conduit 161 to an annular passage 162 formed between a pair of annular orifice plates 163 and 164. These plates, in the apparatus as shown are mounted between the nozzle flange 140a, and the plate 141. In addition to the annular passageway 162 they also define an annular orifice 162a opening into the main flow path provided by the other apparatus parts. If desired, the orifice could be restricted to one or more drilled openings communicating with the passageway 162, rather than being a continuous opening.

In operation, using an annular orifice 162a, the extruded material flowing through the central passageway provided by the nozzle and the fixed and rotatable parts mounted thereon, is laminarly coated by the extruded material released through the orifice from the extruder 160. Additional materials may be similarly introduced to produce any desired degree of lamination.

By rotating the die structure, any gauge variation induced by inequalities in the orifice will be regularly distributed in helical fashion in the extruded annularly shaped film discharged. Additionally, if the orifice 162a is replaced by one or more individual orifice openings, one or more individual stripes of a second material may be laminated on the main flow stream. As these stripes are discharged from the rotating die orifice they will assume a helical flow path on the extruded tube surface.

The novel apparatus shown in FIGS. 1-8 is capable of producing many types of laminated products, many of which are formed to possess exceptional and unexpected properties.

An illustrative list of products capable of at least semi-solid fluid flow which could be laminated in various combinations follows. Note that this list is representative only and is not to be considered as limiting combinations selected therefrom.

Acetal
Methyl Methacrylate
Ethyl Cellulose
Cellulose Acetate
Cellulose Acetate Butyrate
Cellulose Nitrate
Nylon
Polyethylene, High, Medium & Low Densities
Polypropylene
Co-polymerized Polyolefins
Polyallomer
Polycarbonate
Poly I Butene
Polychlorotrifluoroethylene
Polytetrafluoroethylene
Fluorocarbon
Polystyrene
Styrene Acrylonitrile Copolymer
Acrylonitrile Butadiene Styrene Terpolymers
Vinyl Acetate
Vinyl Alcohol
Vinyl Butyral
Vinyl Chloride Rigid
Vinyl Chloride Acetate
Vinyl Chloride Elastomeric Compounds
Rubber Extrusion Compounds
Chlorinated Rubber
Hard Rubber
Silicone Rubber and Compounds
All extrudable thermosetting compounds such as Mylar, Phenolics & Epoxies
Cellophane & Paper Pulp Compounds
Non-Ferrous metals such as Brass, and Aluminum

EXAMPLE 1

As a first example of a film of unusual characteristics which can be formed by the novel process and apparatus of FIGS. 1-8, a novel wrap film can be formed which has an extremely wide seal range. It is known that wrap film must have at least a minimum stiffness (known to the industry as "handle"). Handle is that quality whereby the film will not drop or tend to bunch up. However, the film should be capable of being sealed to itself by heat. To this end, wrap film has been formed of a main layer of polypropylene which provides the requisite stiffness. A layer of polyethylene is then laminated to the polypropylene to permit heat sealing between the overwrapped polyethylene surfaces. To create a good heat seal, the sealing temperature must be very accurately controlled. If the temperature were too low, the polyethylene layer would not soften properly for sealing. If the temperature were too high, the polyethylene layer would be destroyed. In presently used film wrap, this permissible sealing range is only from about 240° F. to 255° F. or about 15° F. In accordance with the present invention, a novel wrap is formed which has a seal range which is extended to the range from 240° F. to 320° F., or 80° F. This permits greater latitude in the design and operation of sealing equipment and also reduces the number of rejects in any given operation.

Figure 9:
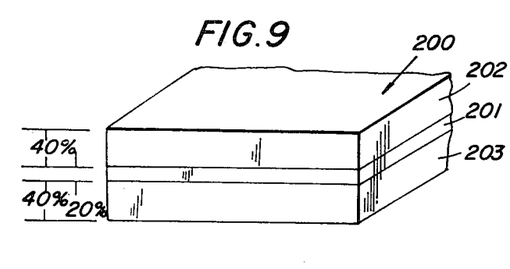
FIG. 9 shows a novel laminated film produced in accordance with the invention.

More specifically, and as shown in FIG. 9, apparatus of the type shown in FIGS. 1-8 can easily extrude laminated film 200 having a central polypropylene layer 201 and outer polyethylene layers 202 and 203. The total thickness of the film is preferably of the order of 1 ±0.05 mil with the polypropylene layer 201 occupying 20% of the total thickness, while the polyethylene layers 202 and 203 each occupy 40% of the total thickness. More generally, the center layer 201 can occupy from 5% to 30% of total thickness while the outer layers 202 and 203 can each occupy from 45% to 35% of total thickness.

While it may be possible to fabricate the novel film of FIG. 9 by other techniques, note that the central film 201 may have a thickness of the order of 0.000066". It would be extremely difficult to handle such thin films in presently known processes for film lamination.

The film of FIG. 9, as indicated above, has been formed to have the requisite stiffness of a wrap film because of the strong polypropylene central layer. The outer polyethylene layers have an increased thickness and therefore an increased thermal inertia. It is believed for this reason that the seal range has been increased to 80° F. (in the order of 400%) when compared to the seal range of presently used wrap film of the same total thickness.

EXAMPLE 2

It has previously not been possible to provide film which is colored to a metallic hue. In accordance with the invention, however, it has been found that when the central layer is of a dyed material and the outer layers are of transparent materials, that the overall film will take on a metallic hue dependent upon the color of the central layer. By way of example, in the embodiment of FIG. 9, the central polypropylene layer 201 can be colored yellow by the mixture of cadmium yellow in the polypropylene melt. When this layer is coated by transparent layers 202 and 203 of polyethylene, the film will take on a metallic gold appearance.

Other similar metallic hues can be imparted to the film by suitably coloring the middle layer of the film.

In a similar manner, a green pigment has been introduced into the central layer with aluminum flakes to impart a green color after coating with a transparent coat.

Clearly, any combination of particular materials could be used other than the polypropylene and polyethylene when obtaining the metallic hue effect.

Note that the film layers can be of any desired relative thickness for this result and that the thickness ratios are not limited to those given in Example 1.

Moreover, the central layer can be formed as a central colored stripe covered by upper and lower transparent films by use of the apparatus of FIGS. 8 or by modifying the apparatus of FIGS. 3, 4 and 5 to inject only a thin stripe from the channel 69.

Thus, some desired pattern of metallic stripes or sections can be formed in the film.

EXAMPLE 3

Figure 10:
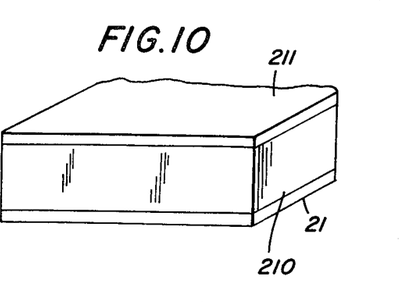
FIG. 10 illustrates a fire-resistant laminated film having a vinyl outer laminate.

It is possible, in accordance with the invention, to form a relatively inexpensive fire-resistant film. By way of example, a film may be formed of a central and main body of fire-resistant polytetrafluoroethylene (melts at 700° F.), as shown in FIG. 10, by layer 210 which may have a thickness in the range of 3–10 mils. The outer layers 211 and 212 may then be formed of polyethylene (or Si compounds) having a thickness of 1 mil. Note that various of the thermosetting materials or silicon compounds could be used as the fire-resistant layer. In this type arrangement, the polyethylene acts as a lubricant for the extrusion of the polytetrafluoroethylene which cannot otherwise be easily extruded. Clearly, other thermoplastics could be used for the outer layers.

The novel lamination apparatus and method may be further used for the preparation of film materials having tear-strips integrally formed therein. Such materials can then serve as a moisture-proof transparent package which can be conveniently opened by pulling the tear strip.

Figure 11:
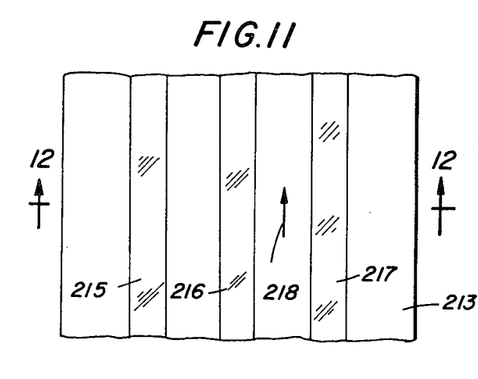
FIG. 11 illustrates a top view of a film having a laminated tear strip thereon.
Figure 12:
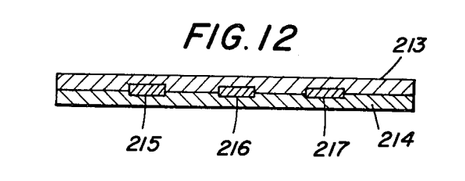
FIG. 12 is a cross-sectional view of FIG. 11 taken across lines 12—12 in FIG. 11.

This type structure is illustrated in FIGS. 11 and 12 wherein a laminated film is formed of outer polyethylene layers 213 and 214 which may have a thickness of 1 mil, and a central 2 mil thick layer of parallel strips 215, 216 and 217 of polypropylene. Generally, the tear strip thickness will be twice the thickness of the body material of the film.

The strips may be spaced from one another along the full width of material, shown in FIG. 11, which would run continuously in the direction of arrow 218. Clearly, the web may be suitably cut and formed into a desired package which would have a relatively strong polyethylene ribbon embedded therein to serve as a tear strip to open the package. If desired, ribbons 215, 216 and 217 could be dyed a suitable identifying color.

Figure 13:
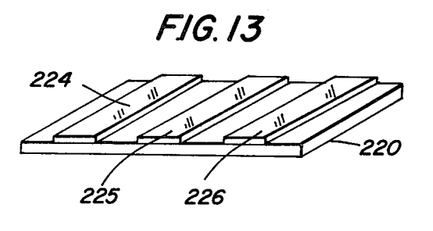
FIG. 13 illustrates in perspective view a further embodiment for a film having a tear strip therein.
Figure 14:
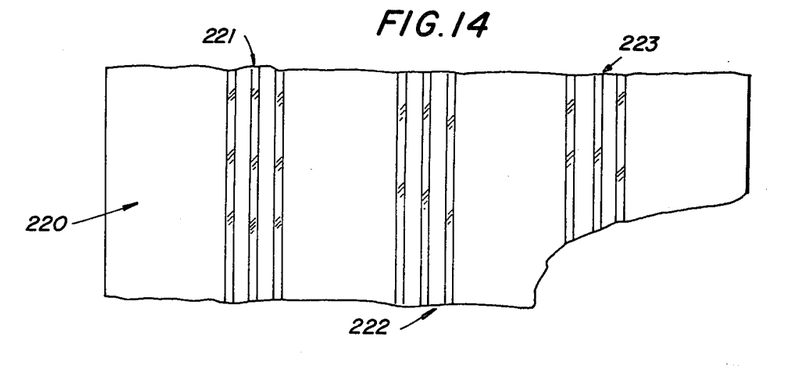
FIG. 14 shows a top view of the web shown in FIG. 13.

As an alternative to the structure of FIGS. 11 and 12, tear strips could be formed in the manner shown in FIGS. 13 and 14. Referring to FIG. 14, I have shown a polyethylene web 220 which has groups of polypropylene strips 221, 222 and 223 laminated thereon. The web 220 may have a thickness of 1 mil while the strips could have a thickness of 2 mils.

Each of the groups of strips include three strips such as strips 224, 225 and 226 for group 221 (FIG. 13). Those regions between adjacent strips are regions of relatively low strength. Thus, if a package is formed of selected portions of web 220, and group 221, for example, surrounds the package, the central strip 225 (which could be colored) could be pulled, with the polypropylene regions between strips 224 and 225, and strips 225 and 226 separating.

EXAMPLE 4

Figure 15:
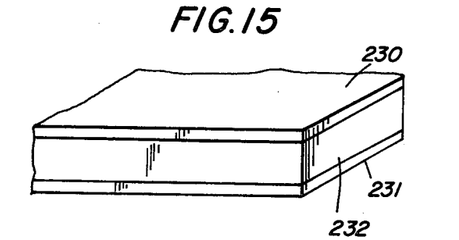
FIG. 15 shows a high strength film having stiff outer layers on a relatively soft and inexpensive inner layer.

It is well known in structural fields that a very high strength structure is formed when a high strength stressed skin structure is formed on a relatively weak web. More specifically, and as shown in FIG. 15, a film of relatively thin high strength outer layers 230 and 231 connected by a relatively thick, inexpensive central layer 232 has been formed. Thus, in FIG. 15, outer layers 230 and 231 are formed of polypropylene having a thickness of the order of 0.15 mil (15% of the total film thickness of 1 mil) joined by a central polyethylene layer having a thickness of the order of 0.70 mil (70% of total thickness). Thus, the film is relatively inexpensive because of the preponderance of polyethylene, but is still very stiff because of the structural arrangement.

EXAMPLE 5

The present invention also permits the formation of an oxygen transmitting film which is essential for meat wrap use or the like. It is desirable to use polyethylene in meat wrap type film because of its low cost, and easy wrapping characteristics. However, when polyethylene has a thickness greater than 0.5 mil, it will block the passage of oxygen. However, since it is now possible to deal with such thin layers in the novel apparatus of this invention, a central oxygen transmitting body of a suitable vinyl can be laminated with outer films of polyethylene, each of which are under 0.5 mil.

If desired, the thin polyethylene film could serve as the base material and be laminated to outer layers of ethyl cellulose.

EXAMPLE 6

Films presently used for wrapping articles such as meat and flowers commonly have moisture condensed therein to obscure the package contents. In accordance with the invention, the main film body (which could be of the type of Example 5) may have an outer layer laminated thereon of a wettable material such as polycarbonate or polyvinylacetate. This wettable material will prevent clouding due to condensation.

EXAMPLE 7

Film wraps for cheese must prevent transmission of oxygen gas. Polyethylene, which is inexpensive, prevents $O_2$ transmission, is thicker than 0.5 mil, and, therefore, is desirable for use as a cheese wrap. However, polyethylene reacts with cheese, and, therefore, could not be used in the past, but relatively expensive vinyls have been used instead.

In accordance with the invention, a novel cheese wrap having a total thickness of 1 mil is formed of a central polyethylene base having vinyl layers laminated to its outer surfaces. The central polyethylene body may have a thickness of the order of 0.7 mil, while the outer vinyl layers would have a thickness of 0.15 mil.

EXAMPLE 8

In accordance with the invention, a central laminate of a flocking type material such as glass fibers which are plasticized in a plastic material may be laminated between the outer polyethylene surfaces. The thickness of the central layer may be 5 mils, and the thickness of the outer polyethylene surfaces may be 1 mil. The flocking material will now be coated by a smooth outer surface and will not be rough to the touch.

The foregoing examples have all been for the use of the novel products formed by the invention as wraps or containers. I have discovered that the novel method of the invention is also useful for the formation of novel electrical-type components. More specifically, the present invention further contemplates that one of the laminated products may be a conductive-type material which can be laminated with insulation materials in various geometrical arrangements for the formation of electrical resistors, capacitors and inductors,

EXAMPLE 9

Figure 22:
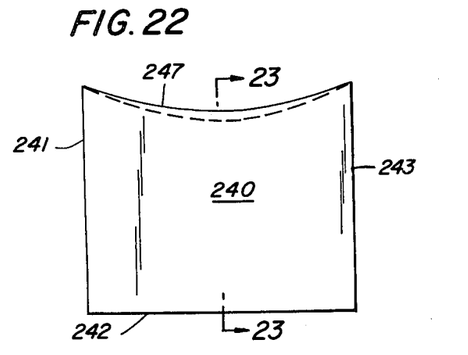
FIG. 22 shows a bag having inwardly curved panel sections to bias the bag open.
Figure 23:
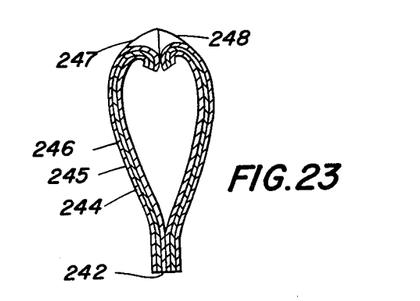
FIG. 23 is a cross-section of FIG. 22 across lines 23—23 of FIG. 22.

Another important product and method, in accordance with the present invention, is in the formation of prestressed film or sheets wherein the film tends to curl. When this type film is used for the making of bags, the free ends of the bags will tend to curl inwardly or outwardly, thereby biasing the bag open. This novel arrangement is illustrated in FIGS. 22 and 23 which show a bag 240 having sealed edges 241, 242 and 243. Note that the bag could be formed of flat or tubular film. Where the bag is tubular, the bottom edge 242 is formed by sealing in the usual manner. The film is then formed of outer polyethylene layer 244 having a thickness of ½ mil, a central layer 245 of polypropylene having a thickness of 1 mil and an inner layer 246 of polyethylene having a thickness of 3½ mils. The upper edges 247 and 248 are seen to curl inwardly thereby biasing the bag open. This novel result is achieved by using different melt temperatures for the inner and outer layers 246 and 244 respectively. That is to say, when the product of FIGS. 22 and 23 is formed in the apparatus of FIG. 1, the polyethylene melt from the extruder connected to channel 35 will be at a different temperature than the melt from extruder 34. Therefore, the cooling rates of the two layers are different so that, upon crystallization of the materials, there will be a built in stress tending to cause the material to curl as shown.

Note that this effect can be obtained from the differential cooling of at least two similar or dissimilar materials. Moreover, note that both channels 35 and 36 could be connected to the common extruder 34 with suitable heaters connected to the conduits leading to channel 35 to cause the difference in melt temperature.

The electrically conductive laminate or strip will be formed by a conductive-type material carried in a plasticized carrier. By way of example, a large concentration of carbon particles can be plasticized in a polypropylene mix so that a strand having relatively high conductivity as compared to normal polypropylene can be extruded in a film or sheet form.

A suitable material can be formed of a plasticized mixture of 15% powdered bronze metal, 60% graphite or carbon power and 25% polypropylene. Clearly any desired thermoplastic material can be used as a carrier vehicle for the conductive substance.

Figure 16:
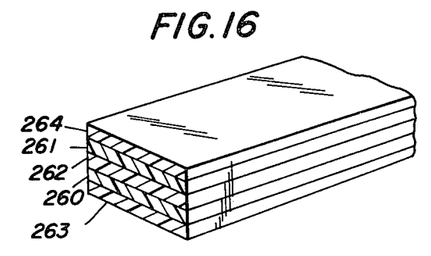
FIG. 16 illustrates in perspective the manner in which an electrical capacitor can be produced in accordance with the techniques of the present invention.

As a first embodiment of the invention for application to electrical devices, FIG. 16 illustrates a five-ply structure which has two conductive layers 260 and 261 which are separated by a high dielectric layer 262. Layer 262 can, for example, be of polypropylene having a thickness of 5 mils, while layers 260 and 261 are electrically conductive layers formed of carbon powder particles embedded in a polypropylene carrier. The spaced conductive sheets 260 and 261 can then define the electrodes of a capacitor. Additional insulation layers 263 and 264 which can, for example, have a thickness of ½ mil and may be of polyethylene are then placed on the exterior of conductive electrodes 260 and 261 so that if these electrodes are rolled into a tight, rolled package, the opposite surfaces of the capacitor will now be short-circuited. When access is required to one of the conductive layers for the connection of an electrical lead, the thin insulation coatings 263 and 264 can, of course, be easily scraped away.

The structure of FIG. 16 can, of course, be drawn from apparatus of the type shown in FIGS. 1 and 2 wherein the full web width is sliced into segments having a width of, for example, 1 inch, with these 1 inch sections being rolled up on a suitable roll. The structure may then be rated as having a certain number of micro-microfarads per inch, whereby a user, after determining the amount of capacitance which he needs, will simply cut off a suitable length from the roll and his capacitor will be available to him.

While FIG. 16 illustrates the application of the invention for electrical capacitors, it will be apparent that the conductive material can, by the use of a suitable density of carbon power in the plastic carrier, have a controlled resistance per linear dimension.

Figure 17:
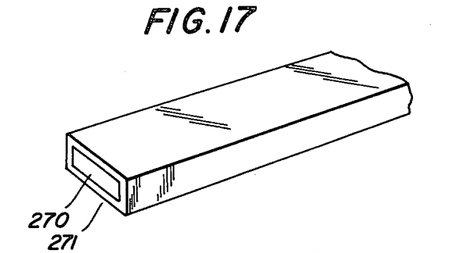
FIG. 17 illustrates in perspective an electrical resistor formed in accordance with the techniques of the invention.

Accordingly, electrical resistors can be formed where, for example, as shown in FIG. 17, a die of the type shown in FIGS. 3 and 4 can extrude a central resistance strip 270 which has a predetermined amount of carbon embedded, for example, in polypropylene which is coated by an outer sheath 271 which could, for example, be of pure polypropylene. Here again, the strip is wound on a roll and an electrical designer, after determining the resistance he desires, will cut off a suitable length for his purpose. Clearly, the structure of FIG. 17, when having suitable conductivity, can serve the general purpose of any insulated conductor.

Figure 18:
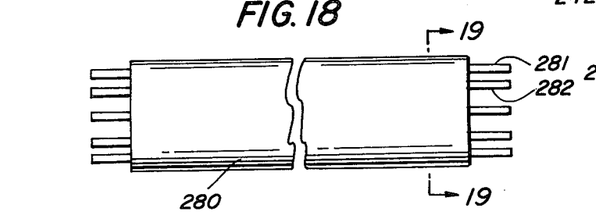
FIG. 18 is a side elevational view of a multiconductor cable constructed in accordance with the invention.
Figure 19:
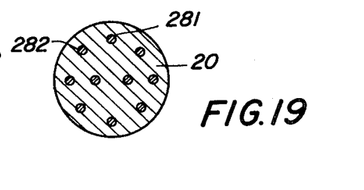
FIG. 19 is a cross-sectional view of FIG. 18 across the lines 19—19 in FIG. 18.

Another manner in which the lamination technique of the invention may be used is illustrated in FIGS. 18 and 19 wherein conductive strands of plasticized material containing conductive powder are embedded in a pure insulation medium for the formation of multi-stranded cable. Thus, a body 280 which could, for example, be of polypropylene has embedded therein continuous strands such as strands 281 and 282 of polypropylene having masticized therein carbon powder or the like. This arrangement which can be extruded by any desired technique will then produce a cable having continuous conductors which are insulated from one another, where any desired number of conductors or filaments can be embedded in the insulation carrier body.

Figure 20:
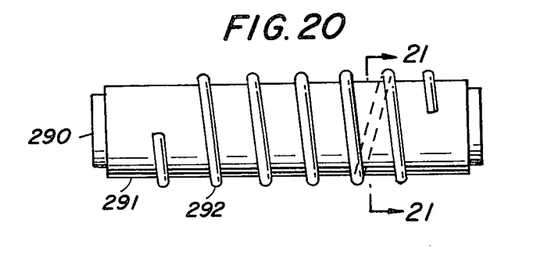
FIG. 20 is an elevational view illustrating an electrical reactor constructed in accordance with the invention.
Figure 21:
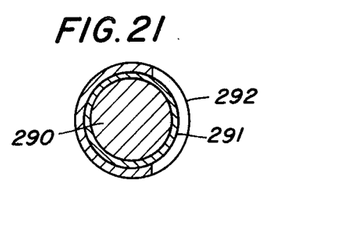
FIG. 21 is a cross-sectional view of the reactor of FIG. 20 across the lines 21—21 in FIG. 20.

FIGS. 20 and 21 illustrate a further application of the invention for the formation of electrical components wherein an inductance winding having a magnetic core is formed in a unitary operation. Thus, in FIGS. 20 and 21, a central core member 290 is formed of some suitable plastic material having, for example, iron fillings embedded therein to produce a relatively high permeability structure. During the extrusion of this material, an outer electrical insulation layer 291 is formed on the magntic body 21, while a spiralling conductive stripe 292 winds around magnetic core 290. Note that insulation layer 291 prevents short-circuiting between the turns of the winding 292. The winding stripe 292, which can be of any suitable plastic carrier having conductive particles embedded therein, is caused to wind through the use of a rotating die structure of an arrangement similar to that of FIG. 8.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

The embodiments of the invention in which an exclusive privilege or property is claimed are defined as follows:

1. A method for the extrusion of a composite stream of heat-plastified synthetic resinous material in a sheet-like configuration wherein the composite stream comprises at least three layers of diverse synthetic resinous material, the method comprising:
   providing a first stream of heat-plastified synthetic resinous material to a restraining configuration, the restraining configuration having a generally slot-like extrusion orifice,
   dividing the first stream of heat-plastified synthetic resinous material into a first substream and a second substream having a generally planar configuration,
   providing a second stream of heat-plastified synthetic resinous material, the second stream having a generally planar configuration and a width substantially less than the first and second substreams, positioning the first and second substreams on either side of the second stream, subsequently,
   passing the first and second substreams and the second stream through an elongate slot-like extrusion orifice, the second stream being encapsulated within the first and second substreams in the composite stream, the second stream being generally coextensive with the resultant extruded sheet, the improvement which comprises restricting the flow of the first stream generally at the point where it is divided into the first and second substreams and introducing between the first and second substreams the second stream in a generally planar configuration generally parallel to the first and second substreams and having a dimension substantially less in width than the first and second substreams, and passing the first and second substreams and the second stream to the extrusion orifice by means of a tapering configuration which converges toward the orifice.

2. The method of claim 4 wherein the first stream is divided by a generally cylindrical configuration.

3. The method of claim 2 wherein the generally cylindrical configuration supplies a generally centrally disposed second stream.

4. The method of claim 3 wherein the cylindrical configuration is supplied with the second stream in a generally axial manner.

5. The method of claim 1 wherein the first stream is supplied to the restraining configuration at a location remote from the extrusion orifice.

6. The method of claim 1 including the step of varying the restriction of the first stream to obtain the desired degree of splitting of the second stream between the first and second substreams.

7. A process for the extrusion of multiple-layered sheeting of thermoplastic resin, said process comprising the steps of
   (a) joining in a tube, at least two laminar-flow streams of molten thermoplastic resin into a combined stream of molten thermoplastic resin which has a sharply defined juncture between the components of the combined stream,
   (b) passing said combined stream of molten thermoplastic resin into a manifold of a sheeting extrusion die the juncture plane(s) between each of the individual molten thermoplastic resin components within the manifold being parallel to the principal direction of flow of the resin as it passes from the manifold and takes on the shape of sheeting, and
   (c) whereby a multiple-layered sheeting wherein the individual layers of thermoplastic resin are of substantially uniform thickness over substantially all of the width of the sheeting is formed.

8. The process as defined in claim 7, said joining in a tube comprising combining the flow of at least two laminar-flow streams so that the resultant combined stream has at least two substantially discrete layers with no mixing occuring therebetween.

9. The process as defined in claims 7 or 8, said passing said combined stream comprising allowing the laminar-flow streams to flow into the extrusion die in a uniform configuration so that the separate laminar-flow streams remain coextensive therein.

10. A process for extruding multiple thermoplastic resins, comprising:
   (a) supplying separate streams of thermoplastic resins into an extrusion apparatus and causing the streams to combine therein in a flowing manner to form an interface between said streams;
   (b) causing the combined streams to flow laminarly without any mixing across the interface between the thermoplastic resin streams so as to maintain the physical integrity of each stream in said combined stream;
   (c) altering the overall cross-sectional geometric configuration of the combined stream within a forming die thereby providing a thermoplastic resin extrudate exiting said die, having a coextensive, integral, and uniform configuration of said thermoplastic resins in said extrudate.

11. A process as defined in claim 10, said thermoplastic streams forming a layered configuration having a substantially laminar flow.

* * * * *

UNITED STATES PATENT AND TRADEMARK OFFICE
CERTIFICATE OF CORRECTION

PATENT NO. : 4,435,241
DATED : March 6, 1984
INVENTOR(S) : Herbert O. Corbett

It is certified that error appears in the above-identified patent and that said Letters Patent is hereby corrected as shown below:

Claim 2, line 50, "claim 4" should read as --claim 1--.

Signed and Sealed this

Fourth Day of September 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,435,241
DATED : March 6, 1984
INVENTOR(S) : Herbert O. Corbett

It is certified that error appears in the above-identified patent and that said Letters Patent are hereby corrected as shown below:

ON THE TITLE PAGE:

Insert, --Related U.S. Application Data--
--Division of Ser. No. 350,220
March 9, 1964, Pat. No. 4,165,210--

Column 1, beginning with Line 5, insert,

--This is a division of application
Ser. No. 350,220, Filed March 9,
1964, now U.S. Pat. No. 4,165,210.--

Signed and Sealed this

Thirtieth Day of April 1985

[SEAL]

Attest:

DONALD J. QUIGG

Attesting Officer        Acting Commissioner of Patents and Trademarks